Aug. 5, 1969   R. C. SCHENCK, JR., ET AL   3,459,213
COATED HOLLOW PLUG VALVE
Filed Oct. 19, 1965   2 Sheets-Sheet 1
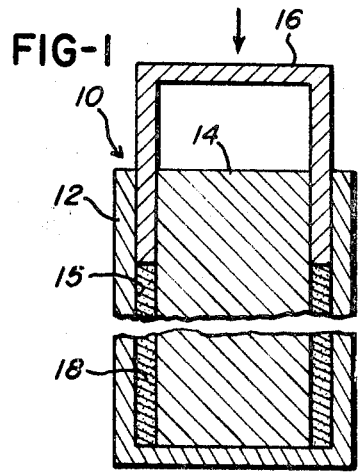
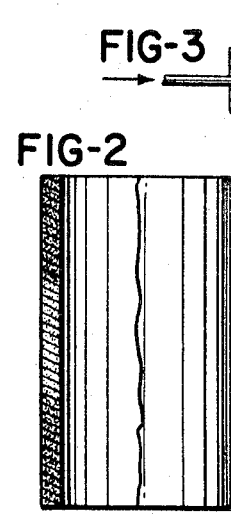
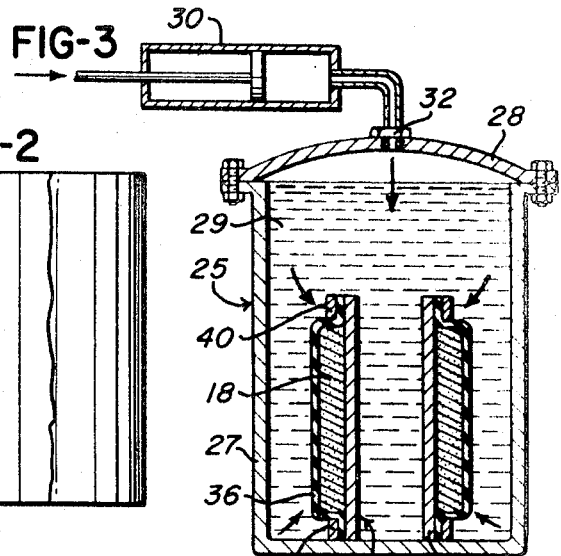
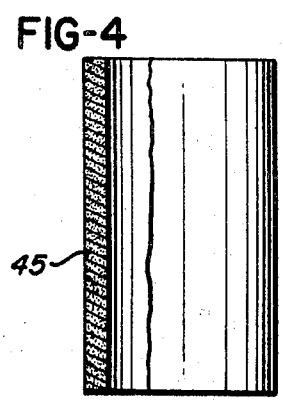
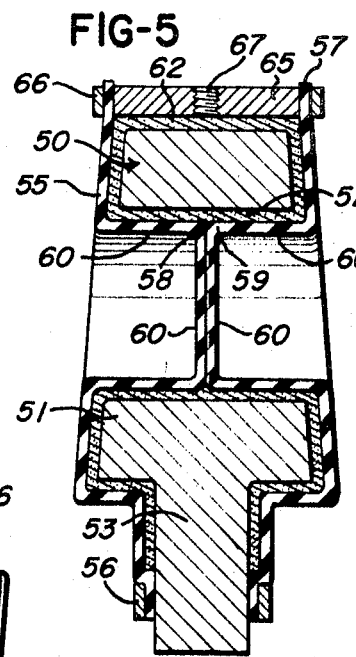
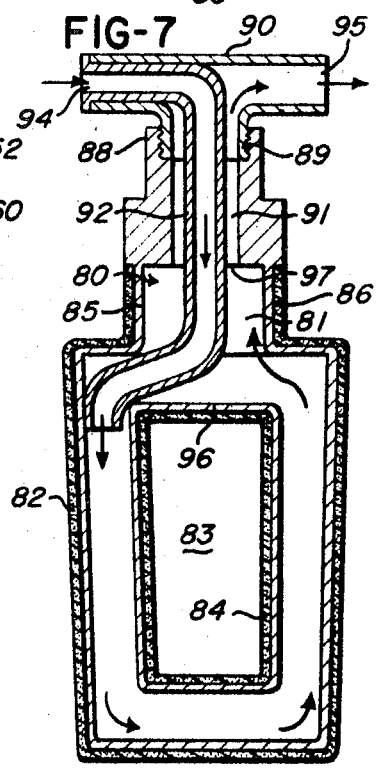
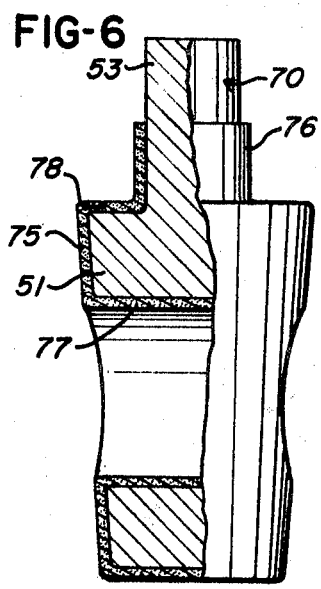
INVENTORS
ROBERT C. SCHENCK, JR.
HERBERT C. FERRIS
*Marshal, Biebel, French & Bugg*
ATTORNEYS 3,459,213
COATED HOLLOW PLUG VALVE
Robert C. Schenck, Jr., and Herbert C. Ferris, Dayton, Ohio, assignors to The Duriron Company, Inc., Dayton, Ohio, a corporation of New York
Filed Oct. 19, 1965, Ser. No. 497,869
Int. Cl. F16l 53/00; F16k 51/00
U.S. Cl. 137—340      8 Claims

ABSTRACT OF THE DISCLOSURE

An isostatic procedure for forming pin-hole, free coatings and parts of polytetrafluoroethylene is described, and offers the advantage of being able to form or coat symmetrical and asymmetrical parts whereby the part or coating has a low percentage of micro-voids and is essentially free of macro-voids while providing a part or coating of substantially uniform density, and dimensional stability over an extended range of temperatures. Parts or coatings are formed isostatically by placing granular molding powder in a forming member including a pressure transmitting surface, exposing the forming member to high pressure whereby pressure is uniformly transmitted through the pressure transmitting surface to compress the powder to provide a "preform." The preform is then sintered to coalesce the compressed powder into a coherent plastic member. Various parts such as valve closure members, tubes, solid shapes and the like may be made by this process, all having the desirable characteristics noted.

---

The present invention relates to an improved polytetrafluoroethylene article and method of making such an article.

Polytetrafluoroethylene (PTFE) is available under several trademark names, for example Teflon[1], Halon[2], Tetran[3] and Fluon[4]. In the case of the material available under the name Teflon, it is supplied in several different grades including Teflon 1, 3 and 5, which are general purpose molding powders, Teflon 7 which is an ultra-fine molding powder, and Teflon 6. Teflon 6 is finer in size than Teflon 7 and is a special purpose molding powder suspended in a volatile liquid organic material by the user. The solvent wets the molding powder which is then used in paste extrusion processing. The material available under the name Halon includes grades G–10, G–50 and G–80, corresponding roughly to Teflon 1, 5 and 7.

The procedures for forming articles of PTFE vary widely and include compression molding techniques and paste extrusion techniques. In the case of paste extrusion processing of PTFE, the shapes are necessarily of uniform cross-section, such as tubes or rods, and the parts have a relatively low percentage of micro-voids, that is, small holes detectable by microscopic examination. By compression molding, various shapes are possible, however, the percentage of micro-voids increases and density differentials appear through the product primarily because of pressure differentials which are characteristic of compression molding techniques, as will be described more fully below.

Accordingly, it is a primary object of the present invention to provide an asymmetric PTFE plastic article having a relatively low percentage of micro-voids and having a substantially uniform density throughout all sections of the article.

Another object of the present invention is the provision of an article which includes a core or base member having a relatively thin coating of PTFE thereon, the coating having substantially uniform density in all sections thereof and being substantially free of pin-hole defects.

Another object of the present invention is the provision of a PTFE article processed from a granular molding powder having at least some characteristics comparable to articles processed from a paste extrusion material by paste extrusion techniques.

A further object of the present invention is the provision of an improved method for the fabrication of parts from PTFE granular molding powders.

A further object of the present invention is the provision of an improved method for fabricating parts from PTFE wherein substantially all surface portions of the part being formed are exposed to substantially the same forces thereby producing a part having substantially uniform density characteristics throughout.

A further object of the present invention is the provision of an improved method for coating or encapsulating parts with an adhesive-free coating of PTFE having a substantially uniform density throughout all sections thereof and being substantially free of pin-hole defects.

Other objects and advantages of the invention will be apparent from the following description, the accompanying drawings and the appended claims.

In the drawings:

FIG. 1 is a schematic illustration of an apparatus used in compression molding a part of PTFE in accordance with the prior art techniques;

FIG. 2 is a view partly in section and partly in elevation of a PTFE article formed by a compression molding technique in accordance with the prior art;

FIG. 3 is a schematic illustration of an apparatus used for forming an article of PTFE in accordance with the present invention;

FIG. 4 is a view partly in section and partly in elevation of an article having physical dimensions similar to that shown in FIG. 2 but processed in accordance with the present invention;

FIG. 5 is a view partly in section and partly in elevation of an assembly in accordance with the present invention used to form a coating of PTFE on a valve closure member;

FIG. 6 is a view partly in section and partly in elevation of a PTFE coated valve closure member in accordance with the present invention;

FIG. 7 is a view partly in section and partly in elevation of a hollow cooled valving member in accordance with the present invention;

Figure 8:
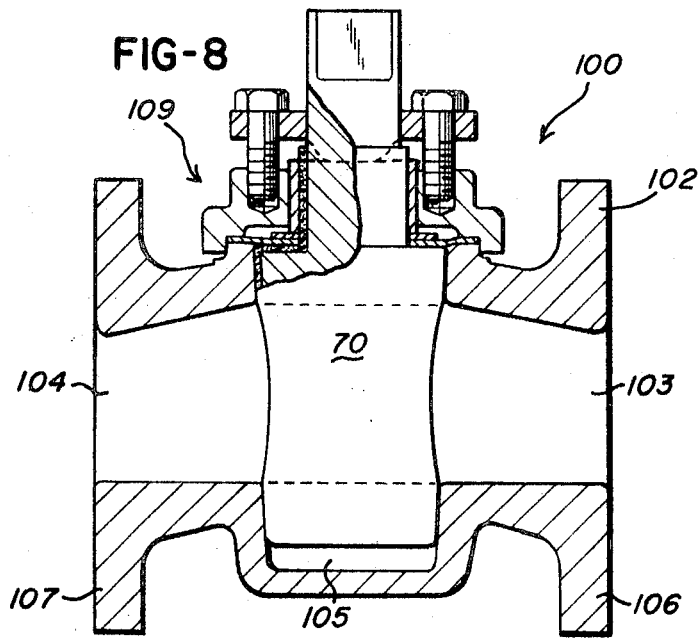
FIG. 8 is a sectional view of an improved valve in accordance with the present invention.

Referring to the drawings, which illustrate preferred embodiments of the present invention, the apparatus in FIG. 1 schematically represents a conventional mold and die combination 10 used in compression molding a tubular element, for example. The mold includes an outer cylindrical casing 12 and an inner core 14 having an outer diameter sufficiently smaller than the inner diameter of the casing 12 to define therebetween a generally tubular cylindrical space 15. A movable die 16 is mounted for reciprocating movement between the casing 12 and the core 14, and the cross-sectional dimension of the die is proportioned for close sliding movement into the annular space 15.

In the formation of a tubular member of PTFE, the die 16 is raised away from the mold 10 and a granular powder 18 is introduced into the space 15. The length dimension of the final tubular element determines the height of powder which is introduced into the space 15,

---

[1] E. I. du Pont de Nemours and Company.
[2] Allied Chemical Co.
[3] Pennsalt Manufacturing Co.
[4] Imperial Chemical Industries, Ltd.

the cross-sectional thickness of the tubular element being determined by the cross-sectional dimension of the space 15 between the core 14 and casing 12. After the proper amount of granular material 18 has been introduced into the space 15, the die is forced downwardly to apply pressure to the granular material to compact it thus producing a "preform." The preform consists of highly compacted granules of PTFE material held together as a result of the force applied through the die 16.

Following formation of the preform, it is removed and placed into a sintering oven when the temperature of the preform is raised to approximately 620° to 740° F. to coalesce and sinter the individual particles of the granular material into a coherent mass. The resulting sintered product exhibits flexibility and toughness and the characteristic milky white color of PTFE parts. After the sintering operation, the part may be cooled under different conditions, rapid quenching or slow cooling depending upon whether dimensional stability and high crystallinity are desired in the final finished part. It has been observed that slow cooling operates to impart high crystallinity and density to the sintered part as well as increasing the dimensional stability thereof. Rapid quenching gives a tougher more flexible part of lower density.

Parts fabricated by a compression molding technique, however, exhibit several disadvantages which limit the application of PTFE material because of the inherent limitations as to the shapes which can be formed by this particular process as well as the inherent characteristics manifested by products formed by a compression molding operation. For example, it is extremely difficult to cause lateral displacement of granular Teflon materials during a compression molding operation. If some lateral displacement is required in order to fill or to conform to a mold contour, the nature of the PFTE granular material is such that it resists lateral movement resulting in localized areas of low and high density as opposed to parts of uniform high density.

In the case of relatively simple shapes such as solid or hollow cylindrical members, there is a pressure decay during the compression operation used to compact the material which results in uneven forces being exerted at various sections throughout the article. Referring for example to FIGS. 1 and 2, the pressure decay characteristic is noticeable at the midsection or lower portion of the mold. While this effect may in some instances be overcome by a compression operation in which the die and mold are each moved to compress the powder, the result is that the pressure differential is manifest at the midsection of the tubular part as shown for example in FIG. 2 by the differences in stippling, the areas of more dense stippling indicating the areas of higher density.

Another characteristic of a compression molded article is the presence of a relatively large number of micro-voids which render the material sufficiently porous to agseous elements so that permeability of gaseous materials may, under certain circumstances, become a problem.

The presence of micro-voids may be substantially eliminated by the use of a paste extrusion technique, but with such a technique there is a limitation as to the cross-sectional shapes which can be formed. For example, it is impossible by present paste extrusion techniques to form a PTFE part having a variable cross-sectional thickness, for example a tapered part or a tubular part having areas of increased cross-section at various points. The material used in the paste extrusion includes a volatile liquid organic material which is vaporized during the formation of the part, and thus the percentage of micro-voids is reduced but this may give rise to the presence of widely dispersed macro-voids, that is, small holes which are visibly detectable. The practical difficulty with this latter type procedure is the added cost of starting materials over granular materials, the cost involved for the various dies required for different sizes of extrusions as well as the different shapes thereof, and the additional precautionary measures which should be taken to remove the volatile vapors.

The differences between a compression molded tube and a paste extruded tube becomes quite noticeable if the tube is to be used in a blow molding procedure of the type described in application Ser. No. 497,825 or application Ser. No. 497,826, filed of even date herewith and assigned to the same assignee as this application. In the forming procedure described in each of these applications, a tube is expanded in size and reduced in cross-sectional dimension which in effect magnifies the presence of whatever micro-voids are present in the starting tubular element. While paste extruded tubes may operate satisfactorily in this process, tubes which have been compression molded exhibit a marked tendency towards the formation of pin-hole defects thereby limiting the use of PTFE in the formation of a continuous liner. In the case of paste extruded tubes, the presence of macro-voids is objectionable if the formed part is to be used in attempting high and low temperature service. Even if a compression molded part could be expanded from a tubular element into a liner without pin-hole defects, the relatively large percentage of micro-voids in the tubular element results in a liner exhibiting a gas permeability characteristic which is not at an optimum relatively low level.

The improved process and article of the present invention combines the characteristics of relatively low percentage of micro-voids, absence of macro-voids and substantially uniform density characteristics of paste extruded products but incorporates the relative simplicity of compression molding techniques.

Another aspect of the present invention which is noteworthy is the production of asymmetrical articles or coatings on asymmetrical articles. For the purposes of the present invention the term "asymmetrical" means an article having a non-uniform cross-section even though there may be at least one axis of symmetry, or an article which has a uniform cross-section and possibly an axis of symmetry but which has a surface contour which varies, i.e., the distance from the axis of symmetry to at least one point on the outer surface varies from the remainder. It is in the formation of asymmetrical articles or coating asymmetrical articles that the present invention derives its optimum benefits.

Referring to FIG. 3, an apparatus is schematically shown for fabricating parts of PTFE granular maaterial in accordance with the present invention by a procedure which is described as isostatic molding. The molding press 25 includes a pressure container 27 having a removable top assembly 28 which is receivable in tight pressure sealing engagement with the pressure container 27 during operation of the press. The press is filled with a liquid material 29 such as ethylene glycol and water or other liquid material, and pressure is applied to the liquid 29 through a piston assembly 30 connected to the press by connections 32.

The procedure for forming a part of PTFE by use of the forming press 25 is as follows. A forming member 35 including a pressure transmitting member 36 having at least one flexible pressure transmitting surface is utilized as a mold for the part to be formed. The pressure transmitting member 36 may be relatively thin elastomeric material such as natural or synthetic rubber or other deformable polymeric material, and granular material is introduced between the pressure transmitting member 36 and an internal metallic mandrel 37 which may be hollow, if desired.

The pressure transmitting member 36 shown in FIG. 3 is in the form of a sleeve, and is assembled to the mandrel as follows: The sleeve is inserted into a metal tube and the ends of the sleeve are flared over the ends of the tube. The internal diameter of the tube is proportioned with respect to the outer diameter of the mandrel so as to provide the desired cross-sectional dimension between these relative surfaces, having in mind the fact that the granular powder will subsequently be compressed. The tube is provided with a pressure fitting so that the negative pressure may be applied thereto to force the sleeve against the tube. The mandrel 37 is then inserted into the sleeve and maintained in the desired spaced relation thereto by spacer elements inserted between the mandrel and sleeve. Granular powder material 18 is then introduced between the sleeve and the mandrel, the pressure is released, and the ends of the sleeve are released from the tube and sealed to the mandrel 37 by top and bottom seal members 39 and 40. In accordance with the present invention, a preferred granular PTFE material is Teflon TFE 6096, a material close in properties to that available under the name Tetran, and characterized as a free-flowing material made up of agglomerates composed of fine particles.

The thus assembled forming member 35 is then introduced into the forming press 25 below the surface of the liquid, and the top cap 28 is closed and sealed. The air above the liquid is removed by introducing additional liquid, and pressure is then applied to the liquid by piston assembly 30. The pressures used during the forming operation may be from 1,000 to 15,000 pounds per square inch with the preferred range being between 1,500 and 10,000 pounds per square inch.

Referring to FIG. 3, as pressure is applied to the liquid 29, it is transmitted equally to all exposed surfaces in contact with the liquid, and through all portions of the flexible pressure transmitting member 26 to the granular material 18 which is compressed against the mandrel 37. The pressure on the outer surface of the member is essentially uniform, and there is substantially no noticeable pressure decay which results in differential densities in the resulting preform. Thus, the substantially uniform pressure which is transmitted to the granular material through the pressure transmitting member 36 operates to effect substantially uniform compaction of granular material.

Following the compaction operation, pressure in the forming press is released, the forming member 35 is removed, and the pressure transmitting member 36 removed from the forming member. The compacted preformed part is then processed by heating in an oven at a temperature of between 620° and 740° F. for a period of time sufficient to coalesce and to sinter the compacted preform. The resultant product is a tubular element 45 shown in FIG. 4 wherein the density of the product is substantially uniform throughout all sections thereof as shown by the uniform stippling. An effect of having substantially uniform density throughout the various sections is to maintain the effective coefficent of thermal expansion substantially the same throughout all sections.

Comparing, for example, the article of FIG. 2 with that of FIG. 4, the article of FIG. 2 shows a differential density and thus, when heated, the areas of greater density show different thermal expansion characteristics that the areas of low density, the actual rate of expansion being described as the effective coefficient of thermal expansion. In the case of the tubular element 45 shown in FIG. 4, the density of the part is substantially uniform throughout and thus the effective coefficient of thermal expansion is substantially the same in all sections. Tubular element 45 also exhibits a relatively low percentage of micro-voids and substantial absence of macro-voids.

The following comparison also demonstrates typical non-uniform characteristics which result from a compression molded part compared to an isostatically molded part formed in accordance with the present invention: Several tubes thirty-two inches long were formed of PTFE in accordance with the present invention as described above. Six hollow rings were cut perpendicular to the long axis of each tube, one at each end and a third and fourth at eleven and twenty-two inches, respectively along the length of the tube. The rings taken from each tube were essentially the same size and dimensions. Each ring was tested by pulling to the breaking point, and the average amount of pull in pounds was as follows:

| Ring: | Pounds of pull to break |
|---|---|
| 1 | 51.6 |
| 2 | 51.3 |
| 3 | 49.2 |
| 4 | 50.2 |

Several tubes were formed by a compression molding operation having an inner and outer diameter corresponding essentially to the I.D. and O.D. of those above. These tubes, however, were only nine inches long. Three rings were cut perpendicular to the long axis of each tube, one at each end and one in the middle. The rings taken from each tube were essentially the same size and dimensions. Each ring was tested by pulling to the breaking point, and the average amount of pull in pounds was as follows:

| Ring: | Pounds of pull to break |
|---|---|
| 1 | 54.7 |
| 2 | 46.0 |
| 3 | 53.3 |

While the above data does not offer a direct comparison of the absolute strength of one set of rings versus the other, it does indicate the presence of a weaker section in the middle of a compression molded tube as compared to the distribution of strength in an isostatically formed tube. With this substantial variation in the relative strength of a compression molded nine inch tube, it is believed quite apparent that an even wider variation would exist in a compression molded tube of thirty-two inch length.

When compared to a paste extruded tube, the tube of the present invention is superior in that the strength of the tube is substantially uniform. In a paste extruded tube, the shear at the extrusion head provides a higher strength in the direction of extrusion and reduced strength in a transverse direction. The tubular element of the present invention, however, exhibits substantially uniform strength characteristics in both the axial and transverse direction.

Referring to FIG. 4, the internal diameter of the sleeve is controlled by the outside diameter of the mandrel 37. Control of cross-sectional dimensions and outside diameter may be controlled by properly proportioning the diameter of the pressure transmitting member 36, and diameter of the mandrel and the final accurate control of the cross-section dimension and outside diameter may be achieved by a simple machining operation to produce a sleeve 45 as shown in FIG. 4.

If it is desired to maintain accurate initial control of the outside diameter of the part, the forming member is altered slightly so that the mandrel forms the outside diameter of the part while the pressure transmitting member forms the inside diameter of the part. Essentially the same procedure may be used in the fabrication of other shapes or forms, or in coating solid members with PTFE.

By use of the present invention, it is also possible to form coatings on objects having widely varying shapes. Referring to FIG. 5, a valve closure member 50 is shown including a body member 51 having a port 52 therethrough and a stem 53. The outer surface of the valve closure member is preferably tapered as shown. In order to form a PTFE coating on all surfaces of the valve closure member including the port thereof, the closure member is assembled into an elastomeric pressure transmitting member 55 which is in the form generally of an elastomeric bag. The elastomeric bag is provided with a neck portion 56 which is received in spaced relation over the stem of the closure member. The other end of the bag is open so that the closure member may be inserted through the large diameter end 57. The bag also includes a pair of integral ears 58 and 59 proportioned to be received within the port of the closure member.

After the closure member is assembled into the bag, the space between the bag and the closure member is filled with granular molding powder, including the port thereof, the granular molding powder occupying the space between the ears and the port. The ears are hollow so that the fluid in the forming press 25 may contact the surfaces indicated at 60. After the powder has been introduced into the thus assembled closure member and bag, the base of the closure member is covered by granular powder as indicated at 62, and an end seal member 65 is assembled and sealed to the bag by a clamp mechanism 66. The end seal member 65 is preferably provided with a tapped hole 67 which is used to evacuate the air after the end seal member is mounted. The neck of the bag is sealed to the stem by a resilient sealing member, and the entire assembly is introduced in the forming press 25.

During the application of pressure, all surface portions of the outer bag are exposed to substantially the same pressure conditions to effect substantially uniform compaction of the granular PTFE material between the outer surface portions of the closure member and the inner surfaces of the bag. Since portions 60 of the bag are exposed to fluid under pressure, the granular PTFE material in the port is compacted. Pressures which have operated satisfactorily are within the range previously specified. In this technique, the closure member itself acts as a mandrel about which a coating is formed.

After compaction, the preformed coated plug is removed and sintered as above described, and the outer surface and plug port may be machined to final tolerances. The resulting coated closure member 70 is shown in FIG. 6.

The outer surface of the body member 51 has thereon a relatively thin adhesion-free coating 75 of PTFE which extends part way up the stem 53 as shown at 76. In addition, the continuous coating includes portions 77 in the bore so that all fluid contacting surfaces of the valving member are covered by a PTFE coating as well as portion 78 which is the upper horizontal portion of the valving member. The coating is free of pin-hole defects, and actual closure members made in accordance with the above described procedure when tested electrostatically showed no pin-hole defects in the coating.

It is also possible in accordance with the present invention to provide a hollow metal valving member 80 shown in FIG. 7 wherein the interior portion of the valving member is hollow as indicated at 81, while all outer surface portions are covered by a pin-hole-free coating 82 of PTFE. As in the valving member previously described, the port 83 of the plug is also coated with a PTFE coating 84, so that all fluid contacting surfaces of the valving member are coated with a continuous coating.

The plug includes a stem 85, an outer surface portion of which is coated with PTFE as indicated at 86. The top 88 of the stem is provided with an internally threaded portion 89 for receiving a fitting 90. The fitting and the stem form an outer tube 91 in which is received an inner concentric tube 92. Coolant is introduced through opening 94 of the fitting and flows through tube 92 into the hollow interior portion 80 of the plug, tube 92 preferably being arranged so that a portion thereof extends below the upper section 96 of the port defining wall. Thus, coolant will flow through the plug as indicated by the arrows, and is removed by tube 91 whose open end 97 is positioned above and spaced away from the open end of tube 92. Coolant is removed by flow through tube 91 and through the outlet 95 of the fitting. Tube 92 is sealed to the inlet of the fitting to prevent coolant from flowing therethrough.

The thickness of the PTFE coating on this as well as the closure member of FIG. 6 may be of the order of 0.050 to 0.090 inch and covering all surface portions of the plug as previously described. The advantage of the structure shown in FIG. 7 is the ability to cool the plug, and thus extend the temperature range to which the coating may be exposed.

It is virtually impossible by compression molding techniques to form a continuous one-piece coating of PTFE material on a member such as a valve closure member wherein the port therethrough is also coated. While encapsulated closure valve members are known, and those which have been coated by a spray technique, these structures are different in several material respects. In the case of the encapsulated closure member, the bore thereof is not lined. In the case of a valve closure member which has been formed by a spray coating or electrostatic deposition technique, there is a limitation on the thickness of the coating. Furthermore, when formed by the procedures of the present invention, the coating is substantially non-porous as determined by an electrostatic spark test in which a visible arc is produced wherever there is a thin pin-hole defect in the coating. An additional feature of the coated plug of the present invention is a substantially uniform density of the coating which provides a coated member wherein all sections of the coating have substantially the same effective coefficient of expansion. Since the coating is formed on the closure member directly by the sintering operation, as opposed to a heating and forming operation of the sintered material, it exhibits a primary memory of its sintered shape which is its shape on the plug. This primary memory is quite helpful in maintaining dimensional stability of the part over a wide range of temperatures since the memory tends to cause the part to return to its sintered shape after the part has been elevated in temperature to as high as the sintering temperature.

While the principles of the present invention have been described with reference to a tapered valve plug, it is quite apparent that the principles thereof are equally applicable to ball-shaped valving elements, non-tapered valve plugs or valving members of virtually any shape. In fact, this is one of the prime advantages of the present invention.

As pointed out previously, it is virtually impossible to form such a coating by presently known compression molding techniques because of the resistance of granular PTFE materials being displaced laterally as would be necessary to form that portion of the coating which is in the port of the closure members. The procedure described for coating the valve closure member is representative of the varying and complicated shapes which may be formed by the isostatic compression molding technique of the present invention.

The valving member of the present invention may be assembled into a valve body as shown for example in FIG. 8. As shown, the valve 100 includes a one-piece metallic body 102 having inlet and outlet ports 103 and 104, respectively, opening into a bore 105 which is preferably conical and tapered and extending transversely of the body. The body also includes end flanges 106 and 107 for mounting the valve in a conduit in the usual manner.

Received in the tapered bore 105 is a coated valve closure member of the type described. The body bore need not include a liner or sleeve, and the coating on the valving member operates primarily as a solid lubricant, and secondarily as a corrosion resistant coating for all surfaces of the plug. Thus, by fabricating the body of a corrosion resistant metal or plastic, a valve is provided having exceptional corrosion resistant characteristics.

Mounted on the valve body is a top seal assembly generally indicated at 109 for providing a seal between the top surface of the plug and the body. The top cap assembly also exerts an axial pressure on the plug forcing it into the bore for establishing a seal therebetween. Also mounted on the top cap assembly is a mechanism (not shown) for rotating the plug from an open to a closed position.

It is also possible in accordance with the present invention to use the valving member shown in FIGS. 6 and 7 in a fully lined valve body, and reference is made to Ser. No. 497,825, filed of even date herewith and assigned to the same assignee.

Figure 9:
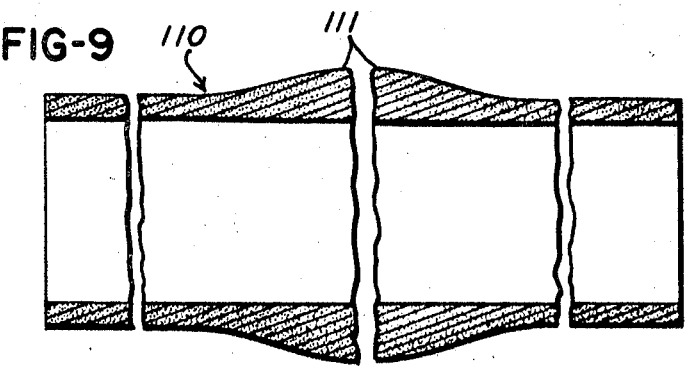
FIG. 9 is a sectional view of a tubular member in accordance with the present invention useable in blow molding a continuous liner into a valve body.

As described in application Ser. No. 497,825 it is preferred to use an isostatically molded tube in the formation of a full liner for the valve body. Referring to FIG. 9, a preferred form of the hollow tube 110 is shown which has been isostatically molded as previously described. The pressure transmitting member for such a tube is an elastomeric sleeve including at its mid-section a portion of increased diameter so as to provide an area of increased cross-sectional dimensions 111 on the finished tube. Thus, the tube 110 includes end portions of substantially uniform cross-sectional dimensions with an increased cross-sectional dimension at the mid-section thereof resulting in a tube including portions thereof of non-uniform cross-section.

As noted previously, it is virtually impossible to form a tube as shown in FIG. 9 by known paste extrusion techniques. Attempts to form such a tube by compression molding techniques to form the tube 110 directly result in areas of markedly decreased density, particularly in the areas 111, due to the resistance of PTFE powders towards lateral displacement. Formation of the tube 110 by a machining operation is objectionable because of the cost of machinery and material waste, and the density distribution inherent in a hollow tubular member formed by a compression molding technique. The tube as described with a portion of increased cross-section is useful in forming a liner since additional material is present so that the larger surface area of the bore may be covered without producing relatively thin sections as compared to the remaining sections of the formed liner. Also, since all portions of the tube, including portion 111, are of substantially uniform density and relatively free of micro-voids and macro-voids, the incidence of pinhole defects is markedly reduced in the final liner.

The use of an isostatic molding process to form an article or coating of PTFE is quite different from the process of isostatically forming ceramic or metal parts or coatings. As a general rule, the pressures used during compaction are considerably in excess of 15,000 p.s.i., and temperatures used for sintering are usually in excess of 800° F.

What is claimed is:

1. A coated article for use in corrosive chemical service having surface portions thereof adapted to be contacted by corrosive fluid during use thereof, said article comprising a base member having a single pin-hole free compressed and sintered polytetrafluoroethylene coating directly in contact with the portions thereof adapted to come into contact with corrosive fluid, said coating having a sufficient thickness to impart corrosion protection to the coated surface portions of said base member and having a primary memory of the surface contour of said base member for providing dimensional stability to said coating in response to variation in temperature, said coating having substantially uniform density throughout the various cross-sectional areas thereof, the effective coefficient of thermal expansion being substantially uniform in all sections thereof, and said coating having a relatively low percentage of micro-voids and being free of macro-voids to prevent transmission therethrough of corrosive fluids.

2. A coated article as set forth in claim 1 wherein said base includes an outer curved surface.

3. A coated article as set forth in claim 1 wherein said coating is of substantially the same cross-sectional dimension in all portions thereof.

4. A coated article as set forth in claim 1 wherein said coating varies in cross-sectional dimension.

5. A coated article as set forth in claim 1 wherein said base member is a valving member having a port therethrough and stem means for rotating said valving member when assembled in a valve, and said coating covering substantially all the fluid contacting surfaces of said member including said port.

6. A coated article as set forth in claim 5 wherein said coating covers at least a portion of the stem means.

7. A coated article as set forth in claim 5 wherein said valving member is hollow, and includes means mounted on said valving member for introducing and removing a coolant circulated through said hollow valving member.

8. A coated article as set forth in claim 5 wherein said valving member is a conical tapered plug for use in a plug valve.

References Cited

UNITED STATES PATENTS

| | | | |
|---|---|---|---|
| 2,204,724 | 6/1940 | Cope | 137—340 |
| 2,807,511 | 9/1957 | Fleming | 264—127 XR |
| 3,015,855 | 1/1962 | Merkel | 264—127 |
| 3,157,195 | 11/1964 | McIntosh et al. | 137—375 |
| 3,227,174 | 1/1966 | Yost | 137—375 |
| 3,235,636 | 2/1966 | Trimble | 264—127 XR |
| 3,235,637 | 2/1966 | Hoffman et al. | 264—127 XR |

FOREIGN PATENTS

| | | |
|---|---|---|
| 566,811 | 12/1958 | Canada. |
| 326,610 | 2/1958 | Switzerland. |

HENRY T. KLINKSIEK, Primary Examiner

U.S. Cl. X.R.

117—132; 137—375; 251—368; 264—127